United States Patent
Beckmann et al.

(10) Patent No.: US 6,737,181 B2
(45) Date of Patent: May 18, 2004

(54) METHODS AND APPARATUSES FOR A SELF-REGULATING GAS DISPLACEMENT PUMP FOR A FUEL CELL SYSTEM

(75) Inventors: Gerhard Beckmann, Altamont, NY (US); Eric J. Brown, Voorheesville, NY (US)

(73) Assignee: MTI MicroFuel Cells, Inc., Albany, NY (US)

( * ) Notice: Subject to any disclaimer, the term of this patent is extended or adjusted under 35 U.S.C. 154(b) by 103 days.

(21) Appl. No.: 09/882,645

(22) Filed: Jun. 15, 2001

(65) Prior Publication Data

US 2002/0192526 A1 Dec. 19, 2002

(51) Int. Cl.[7] .................................................. H01M 8/04
(52) U.S. Cl. .............................. 429/13; 429/26; 429/34
(58) Field of Search .............................. 429/13, 17, 26, 429/30, 32, 34; 99/323.3

(56) References Cited

U.S. PATENT DOCUMENTS

| | | | | |
|---|---|---|---|---|
| 3,580,163 A | * | 5/1971 | Farrell | 99/310 |
| 4,420,544 A | * | 12/1983 | Lawson et al. | 429/13 |
| 5,573,866 A | * | 11/1996 | Van Dine et al. | 429/13 |
| 5,599,638 A | * | 2/1997 | Surampudi et al. | 429/33 |
| 5,773,162 A | * | 6/1998 | Surampudi et al. | 429/39 |
| 5,795,496 A | * | 8/1998 | Yen et al. | 252/62.2 |
| 5,945,231 A | * | 8/1999 | Narayanan et al. | 429/30 |
| 5,992,008 A | * | 11/1999 | Kindler | 29/730 |
| 6,051,266 A | * | 4/2000 | Totsuka | 99/286 X |
| 6,485,854 B1 | * | 11/2002 | Grover et al. | 429/17 |

* cited by examiner

Primary Examiner—Stephen J. Kalafut
(74) Attorney, Agent, or Firm—Mintz, Levin, Cohn, Ferris, Glovsky and Popeo, P.C.

(57) ABSTRACT

A fuel cell system including a housing defining an anode chamber and a cathode chamber and including a catalyst, a protonically conductive but electronically non-conductive membrane positioned between the anode chamber and the cathode chamber, a mixing chamber, a fuel chamber in fluid communication with the mixing chamber, and a first conduit having a first end connected to the anode chamber and a second end connected to the mixing chamber. The first conduit directs a fuel-water solution from the mixing chamber to the anode chamber. The system also includes a second conduit having a first end connected to the anode chamber and a second end connected to the mixing chamber, where the second conduit directs effluent from the anode chamber to the mixing chamber. A coalescing surface provided with at least one of said conduits collects effluent gas produced by said fuel cell.

21 Claims, 5 Drawing Sheets

METHODS AND APPARATUSES FOR A SELF-REGULATING GAS DISPLACEMENT PUMP FOR A FUEL CELL SYSTEM

BACKGROUND OF THE INVENTION

1. Field of the Invention

The present invention is directed to methods and apparatuses for separating gases from fluids in a fuel cell system and using gas to drive the transport of fluids within a fuel cell, and more particularly, to methods and apparatuses for separating carbon dioxide gas from an effluent flow in a direct methanol fuel cell system and using it to move fluids within the fuel cell system.

2. Background of the Prior Art

In recent years, fuel cells, which react hydrogen (extracted from a hydrogen carbonaceous fuel) with air or oxygen have been the subject of intensified development because of their ability to generate electric power from fuel without combustion. Fuel cell systems provide benefits of being able to produce electricity for as long as an appropriate fuel is supplied, low operating costs, and emitting only low levels of carbon dioxide, water and other byproducts of the reaction. Fuel cell systems may be divided into "reformer-based" fuel cell systems, which require some fuel processing to extract hydrogen from the fuel before introducing it into the fuel cell, and "direct oxidation" fuel cell systems where the fuel is introduced into the fuel cell without processing. Adaptation of reformer-based fuel cell systems for use with small applications, such as personal electronic devices, has been difficult, due to the technical difficulties associated with reforming a carbonaceous fuel in a simple and cost-effective manner on a small scale. Hydrogen gas is not well suited to use in small fuel cell systems because its storage requires the use of high pressure vessels, metal adsorption matrices and/or cryogenic liquefaction of hydrogen gas to achieve useful energy densities.

A more convenient source of hydrogen is provided by carbonaceous liquid fuels such as methanol (and to a lesser extent ethanol, propanol, butane, and other hydrocarbons sources). Methanol has relatively weak chemical bonds that can be broken to free electrons to drive an electrical load. One way to convert the chemical energy in methanol to electricity is by using a direct methanol fuel cell (DMFC).

A direct methanol fuel cell system consists of a fuel cell, a fuel source, fluid and air management systems, a pump or mixing chamber, and other ancillary systems required for operation. The electricity-generating reactions occur within the fuel cell. The balance of plant components support the fuel cell by providing reactants to the cell, removing byproducts of the reactions, and otherwise facilitating the operation of the direct methanol fuel cell as it supplies power to the electrical load. It is common practice to connect multiple fuel cells in series, frequently in a "stack" configuration or in a planar system in order to meet the specifications of a given application. Although the present invention is described with reference to a direct methanol fuel cell system (DFMC system), it is understood, however, that the present invention may be suited for use with other direct oxidation fuel cells using other fuels.

In a DMFC system, methanol (typically in an aqueous solution) is supplied to the anode chamber of the fuel cell, which is separated from the cathode chamber of the fuel cell by a protonically-conductive (but electronically non-conductive) membrane (PCM). Catalysts which are present on the anode and cathode faces of the PCM, or which are otherwise present at the membrane surface) enable oxidation of the aqueous methanol fuel at the anode face of the PCM, separating the hydrogen protons and electrons from methanol and water molecules. Upon the closing of a circuit, the protons pass through the PCM, and the electrons are conducted through an electrical load, thus providing electrical power. The protons and electrons recombine with oxygen (preferably supplied by ambient air) on the cathode face of the PCM, forming water.

As a result of these reactions, DMFC systems produce only, water ($H_2O$) and carbon dioxide ($CO_2$) as byproducts of the reaction The overall processes of a DMFC are as follows:

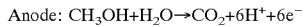
Anode: $CH_3OH+H_2O \rightarrow CO_2+6H^++6e^-$

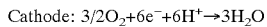
Cathode: $3/2O_2+6e^-+6H^+ \rightarrow 3H_2O$

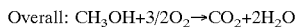
Overall: $CH_3OH+3/2O_2 \rightarrow CO_2+2H_2O$

Anodically generated $CO_2$ is evolved in gaseous form and must be separated from the effluent solution and vented or captured for use within the system. If the $CO_2$ is not vented, as is the case in a closed system, the $CO_2$ pressure within the system will rise. If the pressure allowed to rise unchecked, the flow of the fuel mixture may be interrupted, or may cause a component or the system to fail.

As shown in FIG. 1, which illustrates one embodiment of a DMFC system, a direct methanol fuel cell system 2 includes a housing 4 defining an anode chamber 6 and a cathode chamber 8, a protonically conductive but electronically non-conductive membrane 10 (Protonically Conductive Membrane or PCM) and catalysts (not shown), a mixing chamber or pump 12, and a fuel source 14. Catalysts may be positioned anywhere within the anode and cathode chambers where they will come into contact with the fuel and water mixture, but are preferably is applied to both faces of the Protonically Conductive Membrane.

A gas separator device 16 is placed inline with a conduit that directs effluent from the anode chamber 6 to the mixing chamber. Similarly, water collector 18 is placed inline with a second conduit that directs effluent from the cathode chamber to the mixing chamber.

In gas separator 16, entering effluent contains both unused fuel solution (methanol and water), and $CO_2$. The gas separator removes the $CO_2$, and passes the unused fuel solution back to the mixing chamber using either passive management or a pump to induce said transport.

In water collector 18, water from entering cathodic effluent is collected and recirculated back to the pump or mixing chamber using either passive management, or a pump to induce said recirculation.

FIG. 2 illustrates another prior art fuel system, in which a gas permeable membrane is integrated into a chamber of the fuel cell. Accordingly, as $CO_2$ builds up in the system, it is separated from liquid effluent by passing through the membrane.

In order to commercialize DMFC systems for use in small electronic devices, it is advantageous to remove as much $CO_2$ as is possible from the anodic effluent solution in a simple, compact and cost effective manner. It is of further benefit to capture and utilize the carbon dioxide for use in the DMFC system to minimize parasitic power losses associated with actively managing and driving the fluidic components of the fuel cell system.

SUMMARY OF THE INVENTION

The present invention provides unique methods and apparatuses for transport of fluids in a DMFC system. In the present invention, gas from the effluent flow is allowed to collect on a coalescing surface. Upon reaching a predetermined volume, the product gas of the reaction shears a portion of liquid from the effluent. The released volume of the product gas transports the sheared liquid volume to a predetermined location where the gas is vented to the ambient environment, or directed to perform work within the DMFC. The sheared liquid volume may, for instance, be returned to the inlet flow of the DMFC, accordingly providing a self pumping action.

Accordingly, in one aspect of the present invention, a coalescing surface for inclusion into an element of a fuel cell system includes a vaulted wall having a domed shape.

In a second aspect of the present invention, a coalescing chamber for a fuel cell system includes a substantially closed container having an inlet for receiving effluent produced in a fuel cell and a coalescing surface comprising a wall having a domed shape.

In another aspect of the present invention, a fuel cell system includes a housing defining an anode chamber and a cathode chamber and including a catalyst, a protonically conductive but electronically non-conductive membrane positioned between the anode chamber and the cathode chamber, a mixing pump, a fuel chamber in fluid communication with the mixing pump, a first conduit having a first end connected to the anode chamber and a second end connected to the mixing pump, where the first conduit directs a fuel-water solution from the mixing pump to the anode chamber. The system also includes a second conduit having a first end connected to the anode chamber and a second end connected to the mixing pump, the second conduit directs effluent from the anode chamber to the mixing pump. A coalescing surface provided in the system collects effluent gas from the effluent received from one of the anode chamber and the cathode chamber.

The above identified aspects may be used in a method for separating gas from effluent produced in a chamber of a fuel cell system and includes passing effluent produced in the fuel cell adjacent the coalescing surface, and collecting gas from the effluent adjacent the coalescing surface.

DESCRIPTION OF THE PREFERRED EMBODIMENTS

First Embodiment

Figure 1:
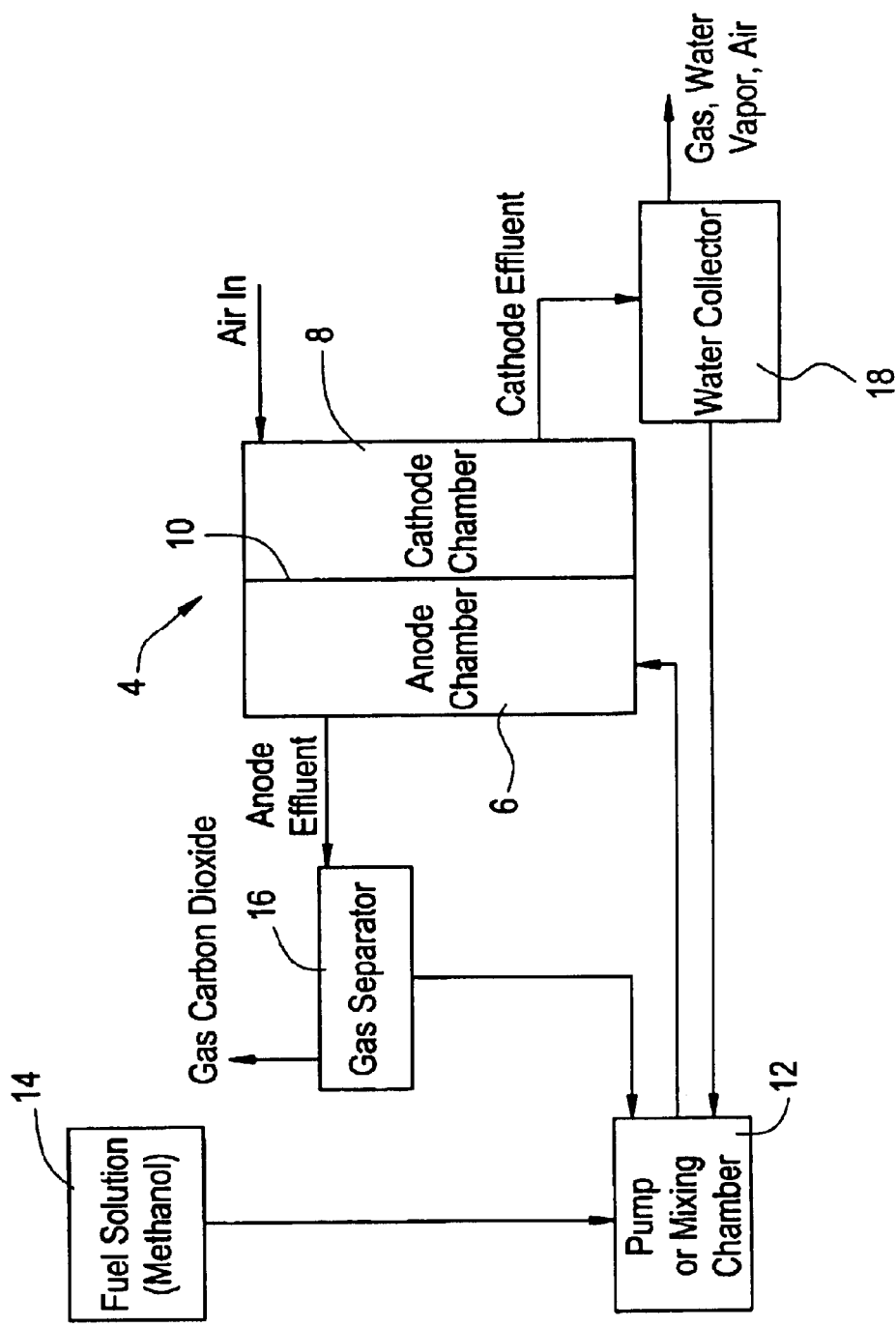
FIG. 1 illustrates a schematic of a fuel cell system using a separate gas separator and pumping system.
Figure 2:
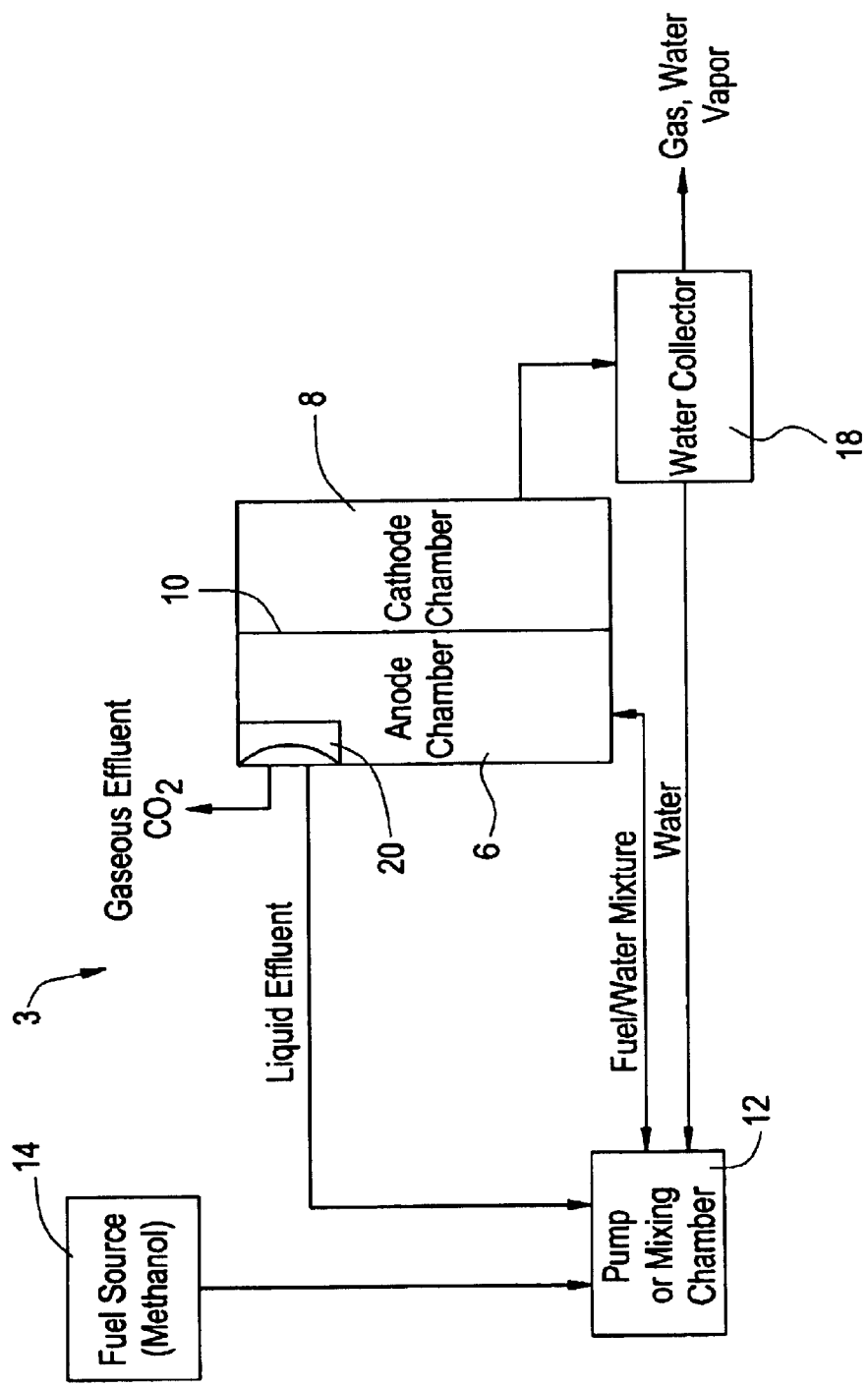
FIG. 2 illustrates a schematic of a fuel cell system using an integrated gas separator in an anode chamber.

In the first embodiment, as shown in FIGS. 3A through 3E, a self driven pump 30 includes a coalescing chamber 33, an effluent inlet 32, and a conduit 38 for ferrying effluent from the anode chamber of the DMFC. Positioned on a top surface of the coalescing chamber is a coalescing surface 36. The coalescing surface is vaulted, comprising a dome shape as shown in the figures, but may include other shapes as well. Conduit 38 is positioned adjacent to the base of the coalescing surface 36, and includes an inlet 40, a neck portion 42 and an outlet 44.

Figure 3A:
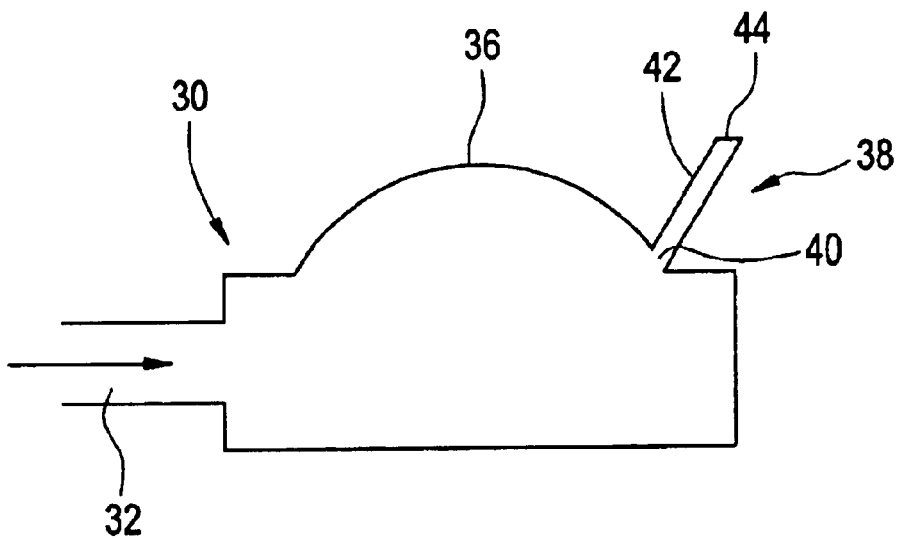
FIGS. 3A–3E illustrate a gas separator pump according to a first embodiment for the present invention.
Figure 3B:
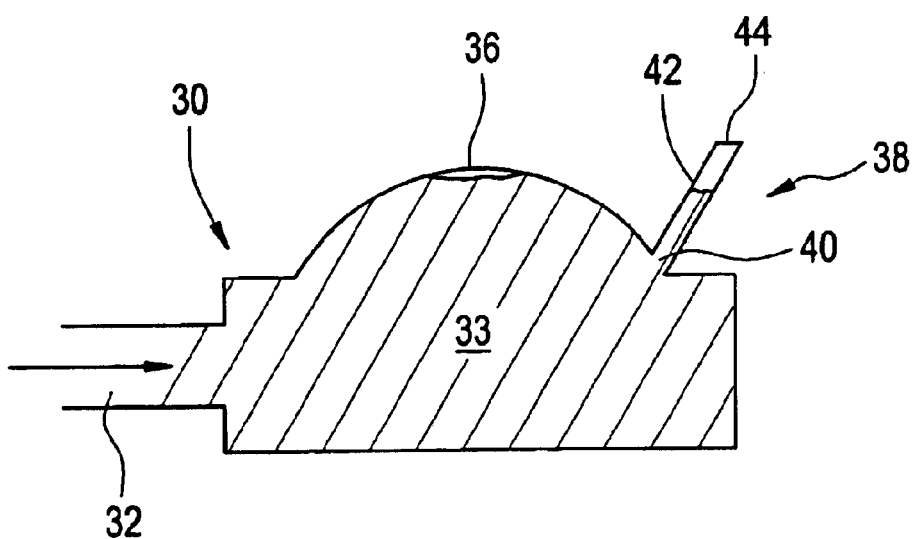
Figure 3C:
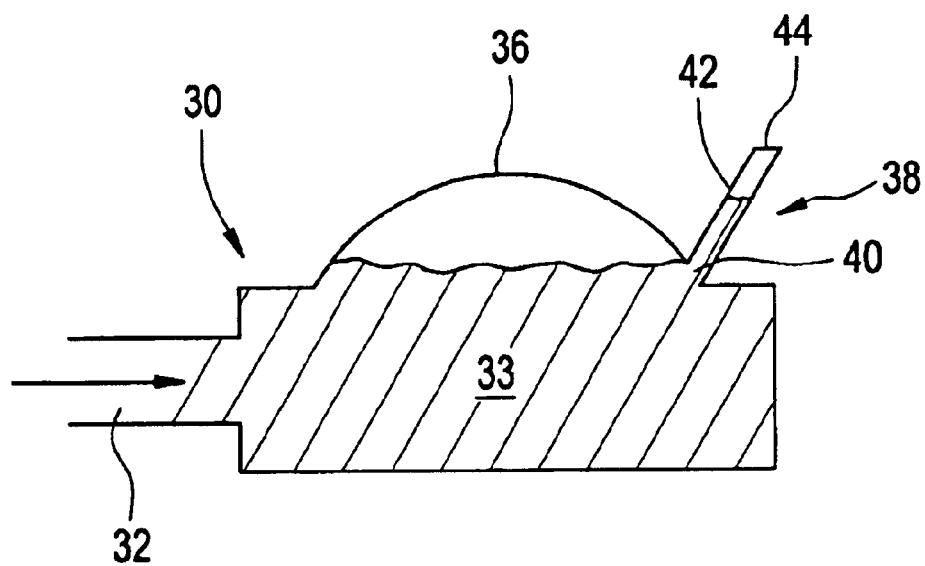
Figure 3D:
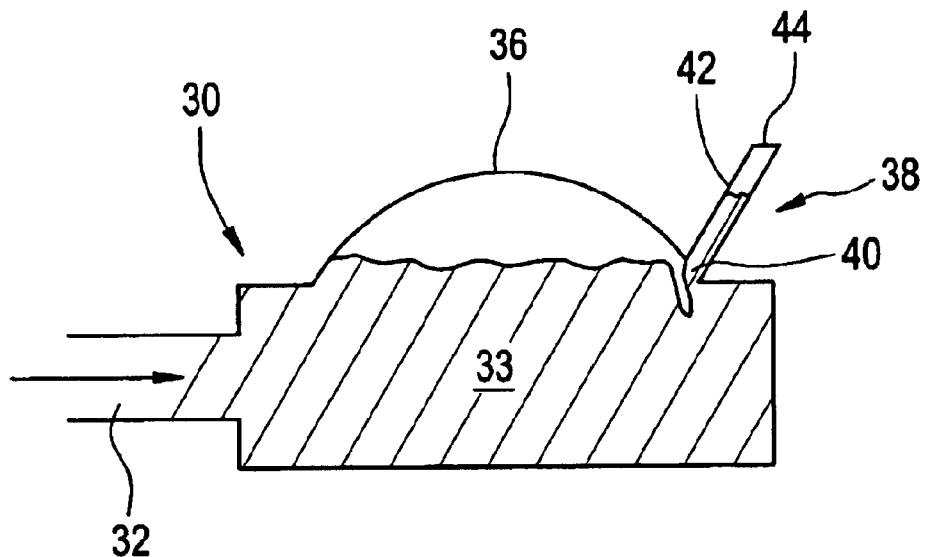
Figure 3E:
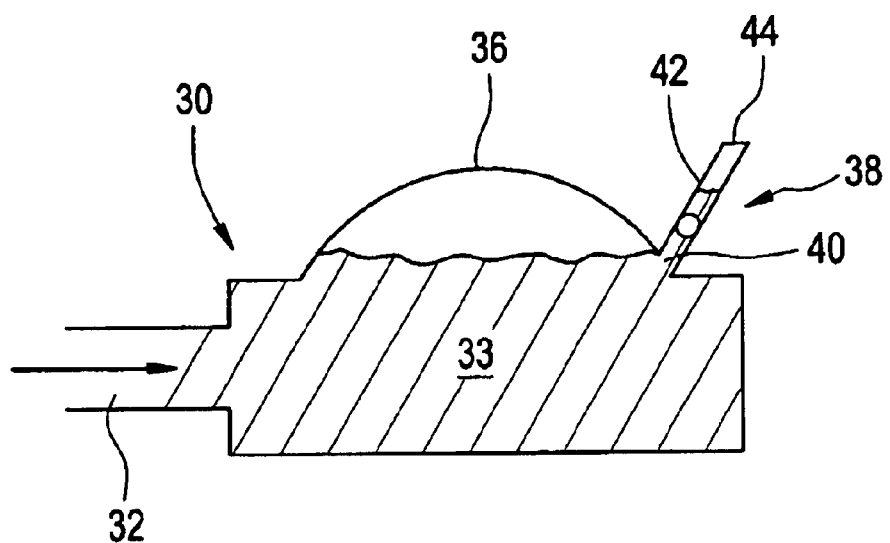

FIGS. 3B–3E shows the self driven pump 30 in operation, illustrating the operation of the pump in a chronological sequence beginning with FIG. 3B, and ending with FIG. 3E. When effluent enters the coalescing chamber 33, the effluent may initially fill the entire chamber, as shown in FIG. 3B. Accordingly, some of the effluent may enter the vent neck portion 42 of the conduit 38. To facilitate the transport of effluent through outlet 44, the coalescing chamber 33 is positioned such that the coalescing surface 36 and outlet 44 extend above the level to which liquid effluent is expected to rise. The outlet 44 may also extend to some portion above the coalescing chamber, and may also include a valve, which may be either mechanically (e.g., flapper) or electrically actuated, to prevent overflow in the event that the coalescing chamber is tipped or inclined from horizontal.

As the fuel cell is used and electrical energy is generated, the electrochemical reactions occurring within the fuel cell produce $CO_2$. Additional fuel or water is supplied to the self driven pump to adjust the concentration of methanol in the aqueous fuel solution so that the fuel cell can continue to generate electricity. The amount of carbon dioxide that is introduced to the self driven pump 30 is directly proportional to the amount of electricity that is generated by the fuel cell. Accordingly, the pump is largely self-regulating; i.e. as the fuel cell generates more electricity, more fuel is consumed, and therefore more carbon dioxide is produced, thus increasing the amount of carbon dioxide in the self driven pump 30, increasing the rate of circulation of the reactants within the DMFC system, or increasing the amount of $CO_2$ available to perform work.

When $CO_2$ is introduced into the self driven pump 30 in the effluent, it rises to the top of the liquid effluent, and thus, rises to the top of the coalescing chamber and coalescing surface due to its low density in comparison with the liquid effluent. There the $CO_2$ collects and increases in volume, displacing the liquid portion of the effluent as illustrated in FIG. 3C. As the direct methanol fuel cell continues to operate, additional carbon dioxide will accumulate in the coalescing chamber 33. When sufficient carbon dioxide has accumulated, the liquid effluent is displaced so that the surface of the liquid effluent is positioned below the inlet of the vent.

When this occurs a portion of the liquid effluent is sheared and lifted from the body of the effluent 31, as illustrated in FIG. 3D. The sheared portion of the effluent will be transported by the $CO_2$ through the conduit 38, as illustrated in FIG. 3E. Conduit 38, will guide the sheared effluent to a desired location, where the $CO_2$ may be vented. Alternatively, the $CO_2$ may be directed into a storage container for subsequent use by the fuel cell system or associated device. Any liquid effluent that is transported through the conduit 38 by carbon dioxide may be reintroduced into the system or vented to the ambient environment as necessary or desired.

Second Embodiment

Figure 4:
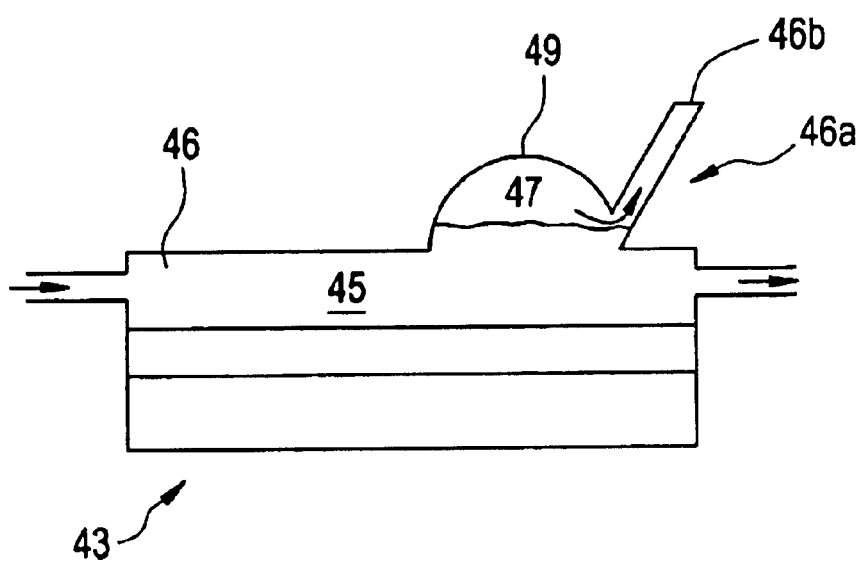
FIG. 4 illustrates a gas separator pump according to a second embodiment for the present invention.

A second embodiment of the present invention is shown in FIG. 4 and illustrates, a flow field plate with integrated self-driven pump 43. As shown, a coalescing surface 49 is provided within the anode flow field plate 46 which collects gaseous effluent 47 from the fuel mixture 45. Vent neck portion 46a directs the gaseous effluent out an outlet 46b. Alternatively, the invention may be integrated into the housing of the fuel cell. This embodiment operates in a manner that is identical to that described in the first embodiment of the present invention. The coalescing surface 49 is vaulted and is preferably positioned in a horizontal orientation so that the $CO_2$ generated in the fuel cell will collect therein.

While the system of the present invention has been described with reference to DMFCs, it should be apparent to those skilled in the art that the system can be applied to any fuel cell system in which a gas is separated from a liquid effluent. The invention also includes applying the pump in a system where a plurality of fuel cells are electrically connected in series or in parallel. In such an embodiment, the operation of the pump remains the same, however, effluent from more than one fuel cell is introduced into the pump.

Having described the invention with reference to the presently preferred embodiments, it should be understood that numerous changes in construction may be introduced without departing from the true spirit of the invention as defined in the appended claims.

What is claimed:

1. A fuel cell system comprising:
   a housing defining an anode chamber and a cathode chamber and including a catalyst, a protonically conductive but substantially electronically non-conductive membrane positioned between said anode chamber and said cathode chamber;
   a conduit in communication with at least one of said anode chamber and said cathode chamber for directing effluent from at least one of said anode chamber and said cathode chamber; and
   a coalescing surface for collecting effluent gas from said effluent received from at least one of said anode chamber and said cathode chamber via said conduit.

2. The apparatus according to claim 1, wherein said coalescing surface is provided on a portion of a wall of said conduit, for collecting effluent gas from said effluent received from said anode chamber and/or said cathode chamber.

3. The apparatus according to claim 1, wherein said coalescing surface is provided on a portion of a wall of said conduit, for collecting effluent gas from said effluent received from said cathode chamber.

4. The apparatus according to claim 1, wherein said coalescing surface includes a vaulted shape.

5. The fuel cell system according to claim 4, wherein said vaulted shape includes a dome.

6. The fuel cell system according to claim 1, wherein said conduit includes an outlet provided adjacent said coalescing surface.

7. The fuel cell system according to claim 3, wherein said conduit includes an outlet provided adjacent said coalescing surface.

8. The fuel cell system according to claim 6 or 7, wherein said outlet includes a first opening positioned at a base of said coalescing surface and a second opening provided above an uppermost portion of said coalescing surface.

9. The fuel cell system according to claim 1, wherein said system is used in conjunction with a bipolar stack.

10. The fuel cell system according to claim 1, wherein said system is used in conjunction with a plurality of protonically conductive membranes.

11. The fuel cell system according to claim 10, wherein said plurality of protonically conductive membranes are assembled substantially in a single plane.

12. The fuel cell system according to claim 1, wherein said coalescing surface is provided in a coalescing chamber, said chamber placed in-line with said conduit.

13. The fuel cell system according to claim 1, wherein said coalescing surface is provided on a surface of at least one of said anode chamber and said cathode chamber.

14. A method for separating gas from effluent produced in an anode or a cathode chamber of a fuel cell system, said system comprising:
   a housing defining an anode chamber and a cathode chamber and including a catalyst, a protonically conductive but electronically non-conductive membrane positioned between said anode chamber and said cathode chamber; and
   a coalescing surface in communication with at least one of said anode chamber and said cathode chamber for collecting effluent gas from effluent produced in said fuel cell;
said method comprising:
   passing effluent produced in said fuel cell adjacent said coalescing surface; and
   collecting gas via said coalescing surface from said effluent adjacent said coalescing surface.

15. The method according to claim 14, further comprising venting said collected gas when a volume of said collected gas reaches a predetermined amount, said collected gas being vented through an outlet provided adjacent said coalescing surface.

16. A fuel cell system comprising:
   a housing defining an anode chamber and a cathode chamber and including a catalyst, a protonically conductive but electronically non-conductive membrane positioned between said anode chamber and said cathode chamber;
   a first coalescing chamber containing a first coalescing surface for collecting effluent gas from said effluent received from said anode chamber; and
   a second coalescing chamber including a second coalescing surface for collecting effluent gas from said effluent received from said cathode chamber.

17. The method according to claim 15, wherein the vented gas is used to transport a fluid.

18. The method according to claim 17, wherein said fluid comprises effluent.

19. A method for moving a fluid in a fuel cell system comprising:
   providing a fuel cell comprising a housing defining an anode chamber and a cathode chamber and including a catalyst, a protonically conductive but substantially electronically non-conductive membrane positioned between said anode chamber and said cathode chamber;
   providing a coalescing chamber in communication with at least one of said anode chamber and said cathode chamber for receiving effluent therefrom, wherein said coalescing chamber includes a coalescing surface for collecting gaseous effluent from said effluent;
   collecting gaseous effluent in said coalescing chamber;
   transporting a fluid using said gaseous effluent collected by said coalescing chamber.

20. The method according to claim 19, wherein said liquid comprises effluent.

21. The method according to claim 19, wherein the fluid is transported proportionately with respect to the amount of gaseous effluent collected.

* * * * *